April 2, 1957  H. J. JACOBSEN  2,787,081
COMBINATION MINNOW TRAP AND BUCKET
Filed Aug. 2, 1956

INVENTOR.
HENRY J. JACOBSEN

United States Patent Office 2,787,081
Patented Apr. 2, 1957

2,787,081
COMBINATION MINNOW TRAP AND BUCKET

Henry J. Jacobsen, Huron, Kans.

Application August 2, 1956, Serial No. 601,748

6 Claims. (Cl. 43—56)

This invention relates to fish traps and buckets and the like, and particularly to a combined minnow trap and bucket.

The main object of my invention is to provide an effective means for catching minnows and small fish without hook or line, and storing the minnows or other fish thus caught.

An ancillary object of my invention is to have a combined minnow trap and bucket which virtually forms a portable unit for convenient handling and use.

Another object of the invention is to have such a combined fish trap and bucket or carrier which includes a screen or wire mesh dome portion rigidly connected to a hollow screen or wire mesh trap body connected to a screen or mesh receptacle for the fish involved.

A further object of this invention is to have a screen mesh minnow trap body provided with a screen mesh dome surmounting it with a converging narrow neck portion interconnecting the two and formed with a narrow entrance slot for the fish.

A practical object of the invention is to have such a screen mesh dome and trap body hinged to the upper edge of the screen mesh receptacle, with the receptacle fitting in a bucket for holding the minnows within the receptacle submerged in water.

It is also an object of my invention to have a small screen bait basket with a bait retaining member in the trap body for holding fish bait within the latter in effective position to attract fish and entice them into the trap through the narrow slot between the trap body and dome.

Another practical object of this invention is to have a combined minnow trap and bucket of the character indicated which is simple in construction, simple to use and easy to make at reasonable cost in order to encourage wide adoption in fishing circles and on the market among sportsmen generally.

Other objects and advantages of my invention will appear in greater detail as the specification proceeds.

In order to facilitate ready comprehension of this invention for a proper appreciation of the salient features thereof, the invention is illustrated on the accompanying drawing forming part hereof, and in which.

In these views, the same reference numerals indicate the same or like parts and features.

Figure 1:
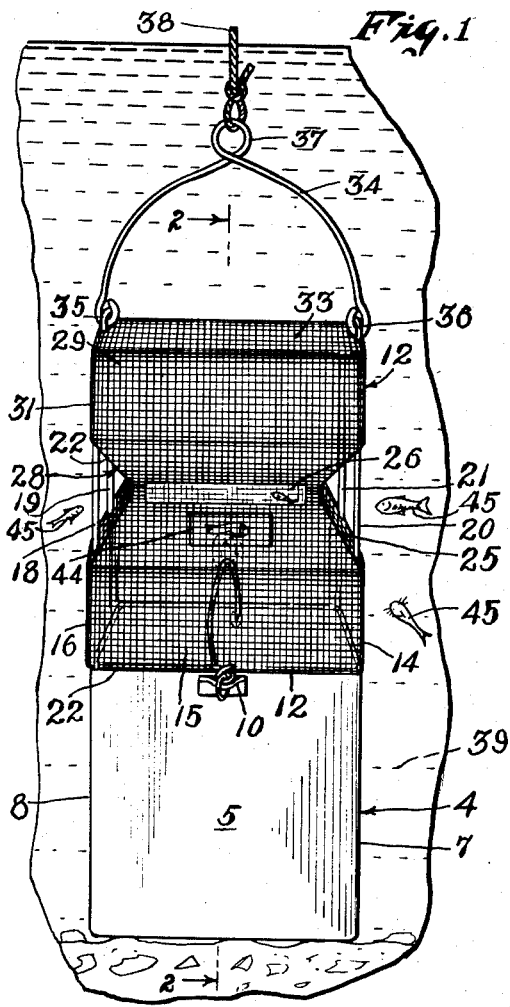
Figure 1 is a perspective view of a combined minnow trap and bucket made according to my invention and embodying the same in a preferred practical form; the trap being shown in active operation.
Figure 2:
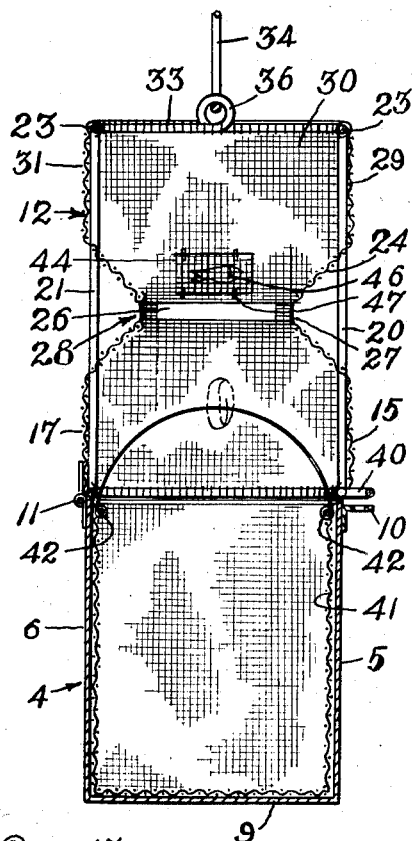
Figure 2 is a vertical section of the same trap and bucket as taken on line 2—2 in Figure 1.
Figure 3:
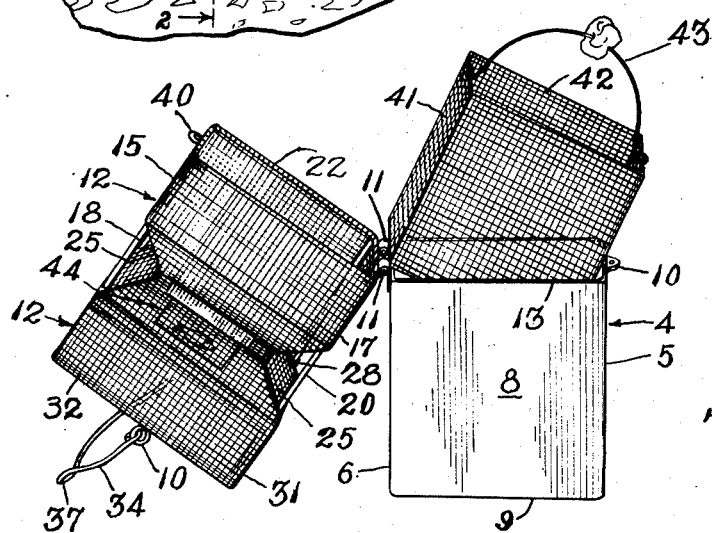
Figure 3 is another perspective view of the combined trap and bucket shown in open position.

Sportsmen who use fishing traps and the like are well aware that such traps, especially those intended for small fish such as minnows, have certain drawbacks and are not too effective in actual use. Moreover, as every fisherman knows, when fish that have been caught by nets or other means exclusive of hooks and lines, are to be kept intact in water, a bucket is obviously necessary for this purpose.

However, when carrying a fish trap or two, a bucket besides presents certain difficulties, and there appears to be no solution offered on the market. Upon considering this problem, it has occurred to me that a minnow trap and a bucket could well be combined, and the trap itself be recast into a novel and effective form of device as well. As a result of such consideration, I have succeeded in producing a novel and effective minnow trap combined with a bucket along the lines already indicated, which will now be described in detail in the following, due reference being had to the previously mentioned drawing.

Hence, in the practice of my invention, a substantially square or rectangular metal or sheet plastic bucket generally indicated at 4 includes the front and rear upright walls 5 and 6 and side walls 7 and 8 connected thereto, as well as the bottom 9 secured to the lower ends of all four walls. Upon the upper front wall is a perforate lug 10, and upon the upper edge of rear wall 6 are mounted a pair of hinges 11, 11 connected to the lower edge of a wire mesh screen trap body 12 opening toward the open top 13 of the bucket 4. The bounding walls 14, 15, 16 and 17 normally extend a distance upwardly from the open end of this trap body and at the corners of the latter are secured to upright rods 18, 19, 20 and 21 secured at their lower ends to a bottom reinforcing rod frame 22, and at their upper ends to a similar top rod or wire frame 23 to form a general frame for the trap body 12.

The screen or mesh walls 14 to 17 converge or slope inwardly at the intermediate portion of the trap body and then slope outwardly again at 24, the inward slope 25 being separated from portion 24 by a slit 26 that preferably extends entirely around the narrow portion of the trap body but leaves the four corners 27, 28, etc., intact and connected so that the trap body forms a unit. The outwardly sloping portions 24 have upper bounding walls 29, 30, 31 and 32 secured at their side edges to the corner posts or rods 18 to 21 and may be substantially in the same planes as walls 14 to 17. At the top of the trap body, the four walls 29 to 32 and frame 23 are all connected to a screen top 33, while a bail 34 is swingably connected at its ends to the two top loops 35 and 36 projecting from frame 23 and serves for carrying the whole device. This bail has a top loop 37 to which a rope 38 may be tied for lifting the trap when submerged in the water 39.

The front portion of frame 22 has a rigid loop 40 that may be tied or locked together with perforate lug 10 on the bucket so that the trap body is closed upon the bucket for active use. On the other hand, within the bucket 4 is removably located a large fish basket 41 with an open top and provided with an upper bounding wire frame 42 about its upper edge, to which is secured the ends of a second bail 43 by which to lift this basket out of the bucket or replace it therein at will. This latter bail is of such dimensions that it fits independently within the trap body without coming into undesirable contact with any part thereof at any time, thus allowing the trap to be opened and closed freely without reference to the basket bail 43.

Furthermore, within the trap body is mounted a small bait basket or holder 44 attached to one wall thereof below the sloping portion 24 and is provided with a pendent wire gate or closure 47 for retaining bait within the basket in effective position to attract fish to the entrance slit 26 so that the minnows will swim directly into the trap when lowered into the water 39 by rope 38 connected to loop 37 as already mentioned. The minnows 45 will enter the slit from any side and when once within the trap body will find freedom of movement upwardly into the dome formed by walls 29 to 32 and screen top 33 and down into the lower portion of the trap body formed by walls 14 to 17, but not out sideways through slit 26 away from the trap as the slit is not obvious but withdrawn a distance within the outline of the trap body as a whole, and the bait 46 retained by gate 47 forms a more or less accessible attraction within the trap.

When the fish are to be taken up, the trap is lifted by its bail 34, the water level immediately lowering about and even in the trap, so that the fish within the latter pass down into the basket 41 within bucket 4 and will remain in the latter because all water has drained out of the trap body and only the bucket now contains water. The trap with its catch in the water of the bucket may then be carried by bail 34 to its destination, when the lug 10 and corresponding loop 40 are then disengaged and separated, the trap body being pivoted on its hinges 11, 11, giving access to basket 41 which will hold the fish in bucket 4 and which when lifted by its bail 43 will bring up the fish or minnows from out of the bucket at will for use as desired.

While the trap as a whole and its trap body, fish basket and bucket have been shown and described as rectangular, all these parts may be made round, cylindrical or of any other sectional form without departing from the spirit and scope of my invention, and of any practical size.

Manifestly, variations may be resorted to, and parts and features may be modified or used without others within the scope of the appended claims.

Having now fully described my invention, I claim:

1. A combination minnow trap and bucket, including a fish bucket having an open top, hinge means upon one portion of the upper edge and a locking projection upon an opposite portion of said upper edge, a hollow screen mesh trap body having a closed screen top and an open bottom matching the open top of the bucket and connected at one portion of its bottom edge with the hinge means and having at an opposite portion of said bottom edge a corresponding projection to which the locking projection may be connected in order to retain the trap closed, and an intermediate portion upon the side of the trap body having a narrow entrance slit opening into said trap body.

2. A combination minnow trap and bucket according to claim 1, wherein a small bait holder is mounted within the trap body a short distance from the entrance slit.

3. A combination minnow trap and bucket according to claim 2, wherein the trap body has a slit extending about several sides while the corners of said trap body are intact.

4. A combination minnow trap and bucket including the bucket and trap body according to claim 2 and having a bail by which to suspend the trap and also an inner fish basket within the bucket with an independent second bail upon said basket within the trap body.

5. A minnow trap and bucket according to claim 4, wherein the trap body has intermediate recessed side portions withdrawn within the outline of said trap body and has the entrance slit in each side located in the withdrawn recessed side portions to render the slits unobvious and unobtrusive to fish swimming inside the trap when the latter is submerged in water.

6. A minnow trap and bucket according to claim 5, wherein the upper portion of the screen mesh trap body forms a screen dome above the entrance slit and the lower portion is open down to the bucket.

References Cited in the file of this patent
UNITED STATES PATENTS

| | | |
|---|---|---|
| 553,456 | Ferris | Jan. 21, 1896 |
| 2,196,928 | Lile | Apr. 9, 1940 |
| 2,731,761 | Marshall | Jan. 24, 1956 |